Patented May 15, 1928.

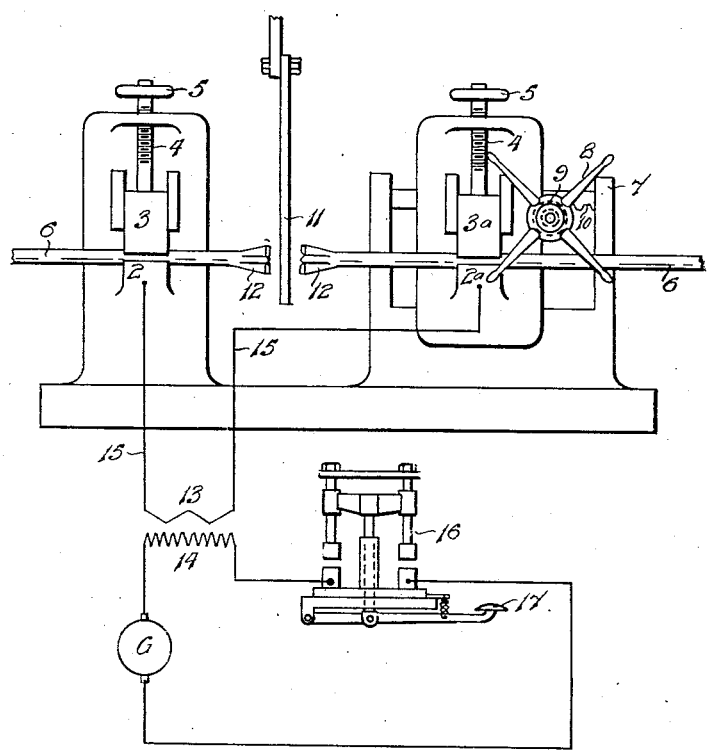

1,670,237

UNITED STATES PATENT OFFICE.

BENJAMIN DANIEL BUSHELL, OF SPRINGS, SYDNEY EDWARD THACKER EWING, OF JOHANNESBURG, AND ERNEST HENRY DOMINICUS BRUNNER, OF SPRINGS, TRANSVAAL, SOUTH AFRICA.

ELECTRICALLY HEATING THE ENDS OF ROCK DRILLS AND THE LIKE.

Application filed August 7, 1926, Serial No. 127,946, and in South Africa September 11, 1925.

The present invention relates to heating the ends of rod-like bodies to temperatures suitable for forging and the like. It refers particularly to heating the worn cutting ends of mining tools for the purpose of sharpening them by forging and for re-hardening them after they are sharpened.

The operations of mining, tunneling, and the like necessitate the use of large numbers of steel tools, such as rock drill tools, coal cutter tools, picks and the like having hardened cutting or striking ends. As these become blunted they have to be re-sharpened by forging and re-hardened after forging. It is not feasible to heat the tools for these purposes in the enclosed space of a mine or tunnel by means of the usual fuel-burning furnaces since the latter vitiate the air and give off large quantities of wasted heat; and it is accordingly the practice to convey the blunted tools to the surface and to return them underground after they have been sharpened and hardened. This involves considerable expense for transportation and also unprofitable outlay for a much greater number of tools than are at any time in use.

The present invention provides an electrical method and apparatus for heating such tools, which produce heat only in the limited portion of the tool which requires to be heated, thus minimizing heating of the atmosphere. Since also the apparatus gives off no injurious fumes, it can be used underground for forging and hardening tools near to their place of use, thus enabling the expense of transportation of tools to be materially reduced and a considerable saving to be made in the cost of the tool equipment.

The apparatus according to the invention is illustrated in the accompanying drawing in which the figure is a diagram.

2, 3 and 2ª, 3ª indicate two pairs of clamp jaws, each pair being fitted with a screw 4 and hand wheel 5 whereby they are forced together to grip the shank of a tool 6. The jaw 2 is fixed to the frame of the machine. The pair 2ª, 3ª is mounted on a slide 7 and can be traversed towards and away from the pair 2, 3, by a hand wheel 8 operating a pinion and rack device 9, 10.

11 is a conductor positioned to come between the ends 12 of a pair of tools 6 held in the clamps 2, 3, and 2ª, 3ª.

Low-voltage current from the secondary 13 of an adjustable transformer 13, 14 is conducted in any suitable manner through the contacts made by the tool ends 12 with the conductor 11; for example by leads 15 connected each to one of the pairs of clamps 2, 3, and 2ª, 3ª, so that the current flows from one tool 6 to the conductor 11 and thence to the other tool 6.

Means are provided for enabling the operator to switch the current on and off rapidly and frequently while watching the heating of the tools. Said means consist of a switch 16 actuated by a pedal 17 conveniently placed so that the operator may keep his foot on it while keeping the tool points in view.

In operation the tools 6 to be heated are secured in the clamps as shown, with their working ends 12 towards one another. By means of the traversing device 9, 10, they are brought into contact respectively with the opposite faces of the conductor 11. The pedal 17 is then depressed, causing current to flow through the tools and the conductor.

The contacts which the tool ends make with the conductor 11 are electrically imperfect and as the result the heating effect of the current is concentrated to a very large extent at said contacts. The tips of the tools adjacent to the conductor 11, accordingly heat rapidly. Before the tips heat to a harmful temperature, the operator releases the pedal 17, thereby shutting off the current, and allows the heat to flow back along the tools from the tip. He then switches on again for further heating; repeating these operations as often as is necessary to enable the required length of the tool back from the tip to become heated substantially uniformly to the desired temperature. For hardening purposes a relatively low temperature heating localized at the point of the tool is sufficient. For forging purposes a higher temperature extending further back from the point is required, and for this purpose the switching on and switching off would be repeated more frequently than for hardening.

The surfaces of the conductor 11 with which the tool ends make contact are adapted to make a reasonably even distribution of the current path over the end of the tool, such as on the one hand to avoid the necessity for preliminary treatment of the end or alteration of its shape, and on the other hand to prevent the contact being so imperfectly distributed as to result in localized arcing and burning without the flow of sufficient current to effect the desired heating of the end as a whole.

For heating the ends of the usual cruciform rock drill tools, the conductor may be a copper plate with plane surfaces, this being found to provide suitable contact with the blunted end of such a tool.

We claim—

The process of heating the end of a rodlike ferrous body such as a percussive rock drilling tool in preparation for forging or hardening said end, which consists in making contact between said end and a non-ferrous conductor which is not a work-piece, passing heating electric current through the end by means of the contact, repeatedly interrupting the heating current in such a manner as to prevent those portions of the body in the immediate vicinity of the contact from being heated to a temperature deleterious to the ferrous metal and to permit the heat developed in said portions to flow into the body away from the contact and to heat to a substantially uniform temperature so much of the end of the body as is necessary to enable the end to be forged or hardened, and stopping the heating operation when that extent of the end attains the temperature suitable for forging or hardening.

In testimony whereof we affix our signatures.

BENJAMIN DANIEL BUSHELL.
SIDNEY EDWARD THACKER EWING.
ERNEST HENRY DOMINICUS BRUNNER.